Nov. 29, 1960    P. R. WHEELER    2,961,828
JET ENGINE FUEL CONTROL
Filed Sept. 25, 1957    3 Sheets-Sheet 1

INVENTOR
PHILLIP R. WHEELER
BY
ATTORNEYS

INVENTOR
PHILLIP R. WHEELER

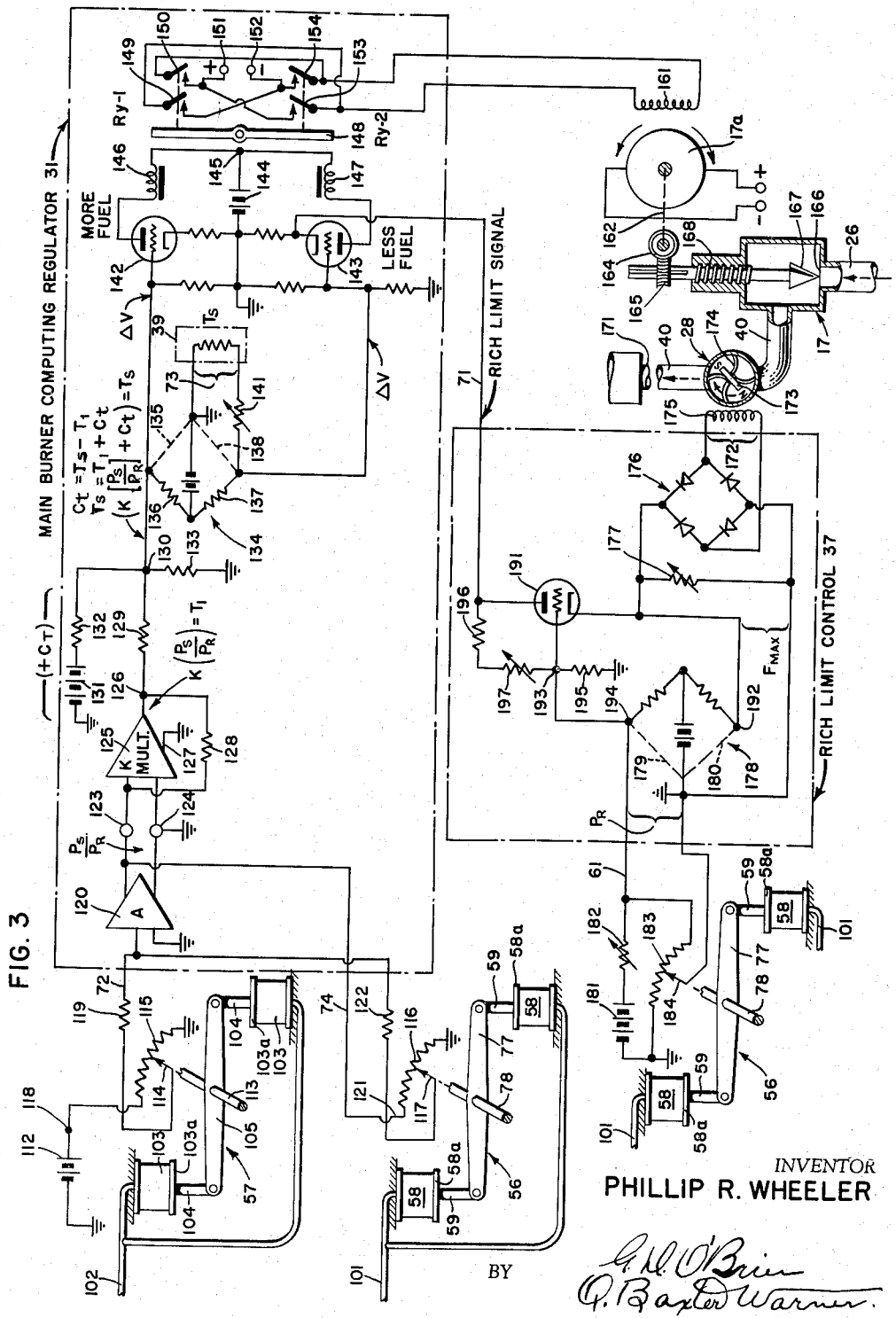

United States Patent Office 2,961,828
Patented Nov. 29, 1960

2,961,828
JET ENGINE FUEL CONTROL
Phillip R. Wheeler, 209 W. Pine St., Alexandria, Va.
Filed Sept. 25, 1957, Ser. No. 686,263
4 Claims. (Cl. 60—39.28)
(Granted under Title 35, U.S. Code (1952), sec. 266)

The invention described herein may be manufactured and used by or for the Government of the United States of America for governmental purposes without the payment of any royalties thereon or therefor.

This invention relates to fuel-feed control devices for power plants such as internal-combustion engines, gas turbines, turbojet or ramjet engines, and the like. It is primarily concerned with, but not restricted to, improvements in control devices for fuel-feeding or charge-forming of the type engine wherein the fuel supplied to the main burner of the power plant or engine is measured or metered on the basis of constant or programmed air speed or Mach number derived from one or more operating functions or characteristics indicative of mass air flow to the engine, air consumption, body static pressure, ram pressure, stagnation temperature, free stream temperature and the like; and wherein the fuel supplied to the pilot burner is metered on the basis of mass air flow to the engine. Such a device may utilize a pressure-type fuel pump and a fuel-inlet valve controlled by a regulator incorporating an assembly which senses changes in the operating functions or characteristics, such as for example, ram pressure, static pressure, and stagnation temperature, and through the medium of a servo mechanism accurately regulates fuel flow as a function of the sensed characteristics.

One use of such fuel control systems has been in fuel control for jet engines in aircraft or missiles designed for operation at supersonic velocities. In this inventive concept, mathematical relationships described hereinafter are utilized in a computing regulator to combine pressure and temperature signals received from sensing instruments or probes. The regulator balances the various signals received according to the desired mathematical relationships and resultantly operates the throttle valve to maintain a relatively accurate, fuel/air ratio or desired constant or programmed velocity throughout the power range.

Prior art methods and devices performing the function of the present invention do not utilize these mathematical relationships, but instead include mechanical and hydropneumatically operated control devices comprising, as transducers, a number of pistons or Sylphons having either fuel pressures or air pressures acting directly on opposite sides of the piston or Sylphon. The relative positions of the pistons and Sylphons of these devices are determined by the relationships between the pressures. Motion of these pistons and Sylphons is transmitted either directly or through a control device to operate the throttle valve. When such motion is used to operate the throttle valve directly or mechanically a certain amount of force must be transmitted from the pistons or Sylphons. As a consequence, one of the disadvantages of such prior art devices is that there is an inherent inaccuracy in the value sensed and the value transmitted due to friction and inertia forces.

Prior art control devices whose motion is used to control the throttle valve incorporate only mechanical advantage or pneumatic principles to reduce the effects of friction. They do not use the concepts of the present invention for this purpose.

Furthermore, in the prior art devices a number of bleeds or restricted orifices are often necessary for fuel control. Each of these bleeds must be carefully calibrated for each set of conditions under which the device is to function. This calibration is inherently a "cut and try" or trial and error operation for each set of conditions, to determine the proper size orifice for each bleed. Such calibration is limited to a calibration of fuel flow, even when the desired quantity to be controlled is velocity or air speed of the missile, of which fuel flow is merely one factor in determining thrust. Combustion efficiency or incomplete combustion of a portion of the fuel is necessarily disregarded in the calibration of the bleeds of such prior art devices. As a result, the calibration can be based on only an approximation of the missile air speed. Such prior art systems, and the approximations in calibration of the bleeds are adequate under many circumstances. However the use, in prior devices, of fuel flow calibration in lieu of the desired speed or Mach number has disadvantages, since it is an attempt to calibrate missile air speed by assuming it is directly proportional to fuel flow. Consequently this may lead to excessive errors in performance. For varying sets of conditions and for higher missile velocities, a device such as that of present invention, which permits a direct calibration of the desired speed of Mach number is more accurate.

Another disadvantage of the prior art devices is that their pistons have mass, and the fuel on each side of certain of the pistons has mass as well. Consequently, forces of acceleration and maneuvering "G" forces upset the balance of forces on each side of the piston and cause malfunctioning of the control. To a lesser extent the mass of the Sylphons which have air pressure on each side is also similarly affected by maneuvering "G" forces.

Further disadvantages of the prior art devices are that the pistons and other sliding parts employed therein must be of precision construction and made to close tolerances for proper functioning. In addition, they are sensitive to dirty fuel. Also, they are limited in minimum size and shape and require complicated castings for their manufacture, thus limiting their flexibility for use in other craft. Flexibility of their location in the aircraft or missile is also limited because they must be positioned in such a way as to minimize the effect of the aforementioned acceleration forces and maneuvering "G" forces on the pistons and Sylphons.

In spite of the aforementioned disadvantages of the prior art devices they are still very useful and function quite well within certain operational limits. The present invention overcomes such disadvantages and many other defects of the prior art and provides for greater accuracy of control.

Accordingly, an object of the present invention is to provide a novel and improved fuel control device which obviates the aforementioned difficulties.

Another purpose of the invention is to provide an improved and simplified fuel control system which is extremely sensitive to variations in operative functions indicative of operational conditions such conditions for example, as air-ram pressure, static pressure and stagnation temperature, and which is capable of transmitting a signal representative of a combination of such functions with a minimum of time delay.

Another object of the present invention is to provide a fuel control device which is insensitive to changes in fuel pressure.

Yet another object of the invention resides in the provision of an improved and simplified fuel control device having a minimum of unbalanced mass in moving parts so as to eliminate errors introduced by inertia and maneuvering "G" forces.

Another aim of the invention is to provide a novel method and means for fuel control whereby calibration of the means may be directly proportional to air speed or to mass air flow.

An additional object of this invention is to provide a fuel control mechanism which will be immune to deleterious effects caused by acceleration forces whether caused by variations in speed or direction.

A further object is to provide fuel control apparatus for vehicles comprising components of minimum size and preferably requiring a minimum of mechanical connections between components, thus permitting maximum flexibility of installation in location as well as in varying types of vehicles.

Still another object is to provide a fuel control system whereby, through the use of a servo feed-back device, sensing elements may be utilized in such a way that they are subject to a minimum of friction or other loads and thus will provide indications which have a maximum of accuracy and a minimum of hysteresis.

Still another aim of the invention is to provide a basic fuel control unit which can be easily converted for use with engines of different capacities or to accommodate changes in combustor design.

Another purpose of the present invention is to provide a fuel control system for aircraft engines or missiles which can be conveniently ground checked to determine whether the components are working properly before take-off.

Still another object of the invention is to provide a fuel control unit which may be easily serviced, comprising components incorporating a plug-in feature, whereby defective components may be easily removed for repair or replacement.

Still another object of the present invention is to provide a fuel control unit for guided missiles which has a high degree of accuracy.

Still another object of the present invention is to provide a fuel control system which is insensitive to dirty fuel.

Another object of the present invention is to provide a fuel control device incorporating a feed-back loop and servo mechanism for rapidly and accurately controlling fuel flow and which is inexpensive and capable of mass production.

An additional object of the present invention is to provide an electromechanical fuel control device for an aircraft engine which controls the fuel/air mixture to the pilot burner to maintain a desired fuel/air ratio over wide ranges of altitude.

An additional object of the present invention resides in the provision of an electromechanical fuel control device for an aircraft engine which can supply the proper quantity of fuel to a main burner to maintain a constant flight speed within close limits at any altitude of flight and can limit the maximum quantity of fuel to the main burner under all operating conditions.

Another purpose of the invention is to provide a fuel control device for missiles which is compact, light, inexpensive and has a high degree of reliability, and which will perform with accuracy under all extremes of temperature, pressure, acceleration, and vibration that result from a missile flying at supersonic speeds and over the temperature range common to missile flight.

A further aim of the invention is to provide a fuel control system which regulates the fuel to the pilot burner of a ramjet engine by comparing a signal proportional to ram pressure with a signal representing actual flow in the pilot fuel line and utilizes the difference therebetween to energize a servo motor, thus controlling the direction of rotation of the motor, which, in turn, positions a throttling valve thereby establishing the desired rate of fuel flow.

A still further object of this invention resides in the provision of a fuel control system which regulates the rate of fuel flow to the main burner of a jet engine in accordance with the magnitude of a signal generated by instrumentation equipment measuring either the velocity error or Mach number error, as required.

Other objects and many of the attendant advantages of this invention will be readily appreciated as the same becomes better understood by reference to the following detailed description when considered in connection with the accompanying drawings wherein:

Fig. 3 schematically illustrates the main burner fuel regulator, sensing-transducing devices, feed-back loop and rich limit control of the invention.

Figure 1:
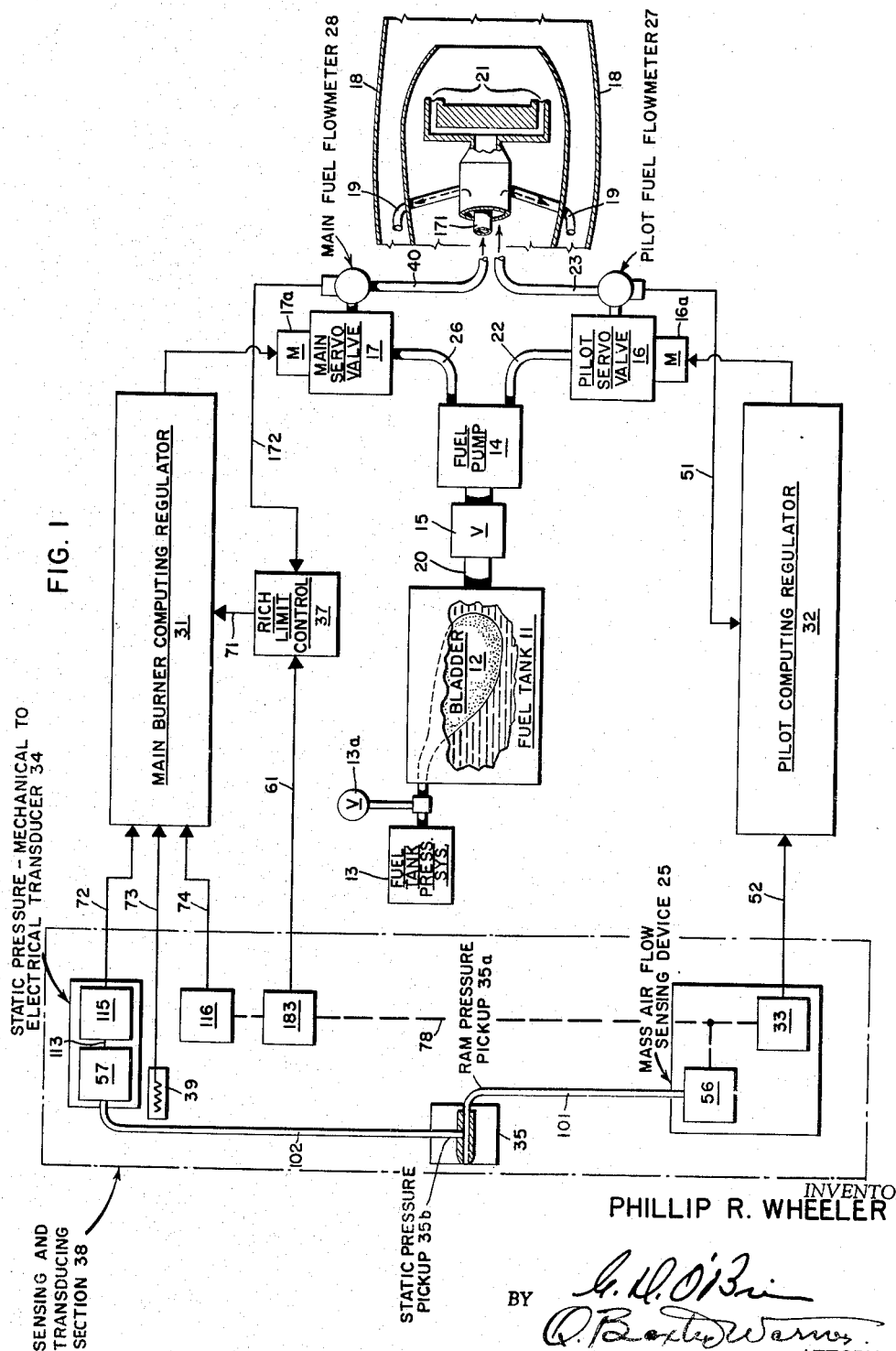
Fig. 1 is a diagrammatic illustration of a complete fuel-feeding system in accordance with the invention.

Described briefly in order to convey an understanding of the general nature and purpose of the invention, the control system of the present invention, as best illustrated in Fig. 1, comprises three basic sections: a sensing and transducing group or section, computing regulator sections and servo control and feed-back loops. The computing regulators receive from the sensing and transducing section intelligence corresponding to operating functions such as atmospheric ram pressure, atmospheric static pressure and stagnation temperature. This intelligence is combined according to a desired mathematical relationship, and the proper resultant signals are then transmitted from the computing regulators to the respective servo control loops. Separate computing regulators may be used as shown so that operation in accordance with different mathematical relationships for different sets of burners may be effected. For example, in a "pilot" burner, the control should maintain a near constant fuel/air ratio in order to assure maintaining a fire. Therefore, the signal to a pilot burner servo control loop may be made directly proportional to ram pressure which is known to be closely proportional to mass air flow (ref. "The Dynamics and Thermodynamics of Compressible Fluid Flow," by Ascher H. Shapiro, Ronald Press Co., N.Y., 1953, p. 84, Formula 4.16). This signal, therefore, maintains the specified equivalence ratio to supply the proper quantity of fuel to the pilot burner for the proper fuel/air mixture at varying altitudes. On the other hand, fuel flow to a main burner in the same engine may be made a function of either true air speed or Mach number depending upon the manner in which the system has been arranged or calibrated. To accomplish this basis of control, the resultant signal from the main burner computing regulator to the main burner control loop is derived from either the velocity error or Mach error signal. The main burner control system is also provided with a rich limit device in order to prevent excessive feeding of fuel in situations where the engine cannot bring the vehicle back to the desired speed or Mach number. The velocity error signal thus maintains desired velocity, i.e. constant velocity or programmed velocity, within narrow limits.

This invention includes apparatus which employs a unique combination of controller equation and input variables more specifically, the invention includes a novel combination of units and components in an electromechanical control system which functions to control fuel flow to the main burner and pilot burner of a combustion engine as a function of the input variables.

Reference is now made to the drawings wherein like reference characters designate like or corresponding parts throughout the several views; there is shown in Fig. 1 a combustor 18 of a power plant or engine in which fuel is burned to provide power. Fuel enters and burns in the combustor 18 from main nozzles 21 and pilot nozzles 19. It is the function of the pilot nozzles 19 to provide fuel to maintain a "fire," i.e. combustion, and thus to permit wide variations in the main fuel/air mixture in the combustor 18 without loss of the "fire."

A fuel tank 11 is provided with a bladder 12 and a pressurizing system 13 for the bladder. A pressure regulating valve 13a regulates pressure on the bladder. The purpose of the bladder 12 is to expel fuel from the tank 11 to a fuel pump 14 which provides additional fuel pressure. A fuel shut-off valve 15 is provided in the fuel inlet line 20. Conduits 22 and 26 from the fuel pump 14 lead to two servo valves 16 and 17, respectively. Pilot servo valve 16 serves as a throttle valve for fuel flowing to the pilot burner 19, and main servo valve 17 serves as a throttle valve for fuel flowing to the main burner 21 of combustor 18. Reversible servo motor 16a opens or closes pilot servo valve 16, and reversible servo motor 17a opens or closes main servo valve 17.

The pilot burner control loop and computing regulator will be described now. In the fuel conduit 23 leading from the pilot servo valve 16 to the pilot burner 19 is a pilot fuel flow meter 27 which derives and feeds back through the pilot control loop 51 to the pilot burner fuel computing regulator 32 a signal proportional to actual weight or volume of fuel flow through the pilot fuel line 23. This feedback signal of loop 51 is compared within the regulator 32 with a signal input at 52 which is proportional to mass air flow. The mass air flow signal is sensed by probe 35 and is transduced by device 25, described later, to provide the aforementioned pilot regulator input signal at 52. When the resultant of the two signals from 51 and 52 is such that fuel flow through the flowmeter 27 is less than that desired, the pilot computing regulator 32 will actuate the servo motor 16a to open pilot servo valve 16 to permit a higher rate of fuel flow until the feedback signal of loop 51 is balanced by the input signal at 52. When the resultant of the two signals from 51 and 52 is such that fuel flow through the flowmeter 27 is greater than that desired, the pilot computing regulator 32 will actuate servo motor M at 16a to close servo valve 16 to reduce the fuel flow until the feedback signal of loop 51 is balanced by the input signal at 52.

The function of the computing regulator 31 for the main burner is to regulate fuel flow so as to maintain the desired missile velocity or Mach number. This is accomplished by a servo-feedback type of control somewhat similar to that for the pilot burner, hereinbefore described. More specifically, a velocity error signal $\Delta V$ is generated in the computing regulator 31 as a resultant of three input signals 72, 73 and 74, which are respectively proportional to static pressure, stagnation temperature and ram pressure. The electrical signal at 72 proportional to static pressure, is sensed by the static pressure pickup portion 35b of probe 35 and transduced by device 34, more fully described hereinafter, to obtain the electrical input at 72. The electrical signal at 73, proportional to stagnation temperature, is sensed by stagnation temperature pickup or transducer 39. This may be any suitable temperature sensitive device such, for example, as a resistor, and may be appropriately located in the engine diffusor duct, for example. The electrical signal at 74, proportional to ram pressure, and therefore to mass air flow in the main burner, is derived from the ram pressure pickup portion 35a of probe 35 and transduced by mass air flow sensing device 25 and transducer 116, more fully described hereinafter, to obtain the electrical input at 74. The function performed in the main burner computing regulator 31 is such that when the missile or aircraft is proceeding at the desired velocity, the signal output to the servo motor 17a will be zero. However, if the velocity increases above or decreases below that desired, a velocity error signal $\Delta V$ will be generated in the computing regulator which will cause the servo system to change the fuel flow to the main nozzles 21, and consequently to the main burner, to bring the velocity of the missile or aircraft back to that desired.

A normally inactive rich limit control 37 is provided for flow of fuel to the main burner to become activated and produce an overriding control signal whenever the fuel/air ratio for satisfactory combustion at the desired speed is satisfied and the main computing regulator 31 still calls for more fuel. This rich limit device prevents an excessively rich fuel/air mixture for the main burner and maintains the desired fuel flow, preventing undesirable increases in the flow. For instance, if the missile or aircraft is maneuvering violently or climbing steeply, it may not be possible for the engine to overcome the increased drag caused by the control surface and so maintain the desired speed or Mach number. In such an instance, without a rich limit control, the main fuel regulator would continue to increase fuel flow to the main burner so that more fuel would be supplied than could be burned. In other words, the fuel/air ratio would be excessively rich. As hereinbefore explained in connection with the pilot burner regulator, mass air flow to the main burner as well as the pilot burner is proportional to ram pressure. Consequently, a rich limit input signal 61 is derived from the ram pressure portion of probe 35, transduced through devices 25 and 183 to provide the electrical signal fed at 61 into the rich limit control 37, where it is compared with output signal 172 from the flowmeter 28. The resulting signal serves as an overriding signal 71 fed into the main burner computing regulator 31 to control the rich limit of the fuel flowing to the main burner.

Figure 2:
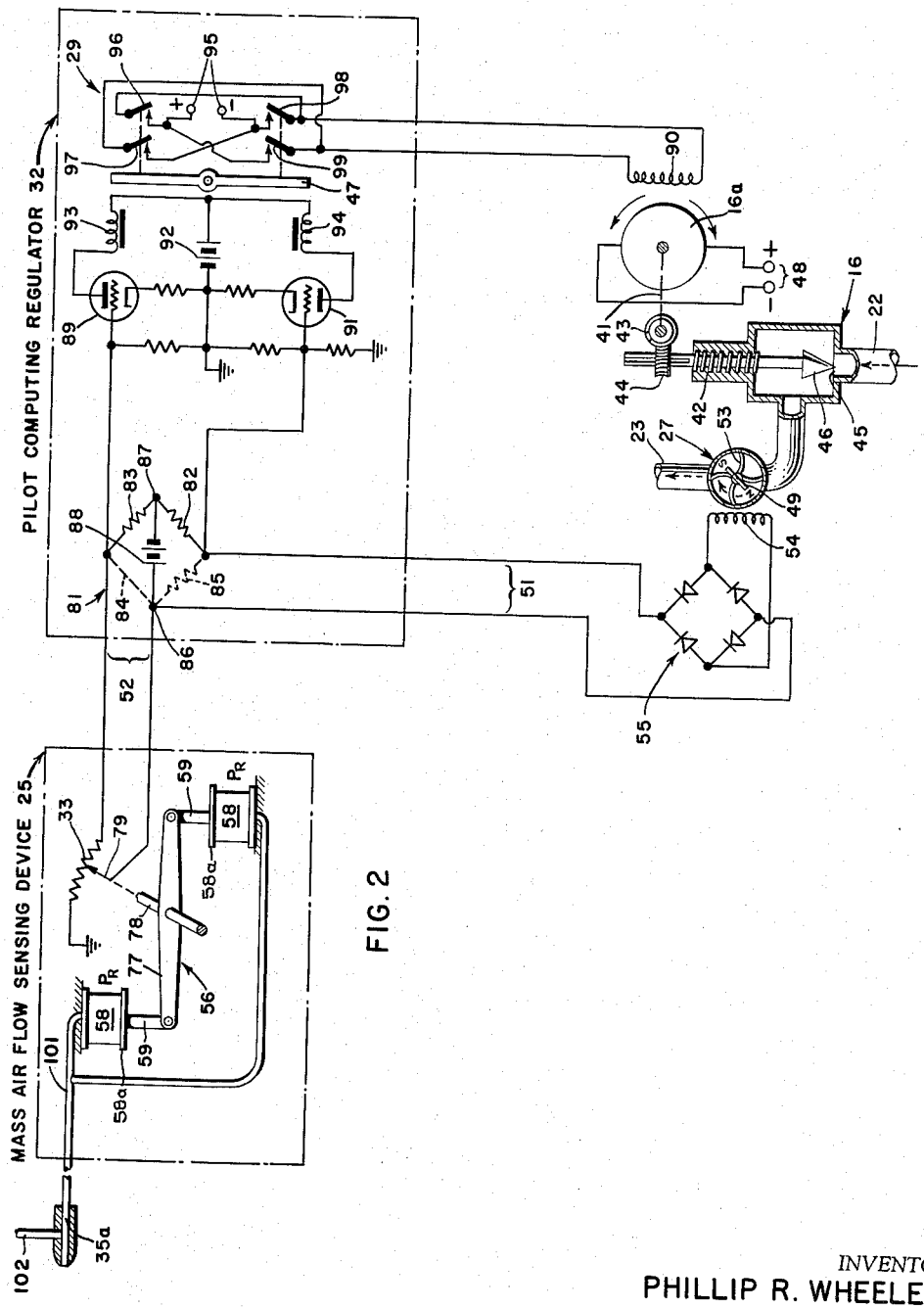
Fig. 2 is a schematic representation of a portion of the system of Fig. 1 showing the pilot burner fuel regulator, sensing-transducing device and feed-back loop.

The pilot burner fuel control portion of the system of the present invention will now be described in detail. Referring to Figs. 1 and 2, the pilot control for regulating the air/fuel mixture for the pilot burner utilizes ram pressure from the ram pressure pickup 35a of probe or Pitot tube 35. This pressure is applied through tube or conduit 101 to the mass air flow sensing device generally indicated at 25, Fig. 1.

As shown in Fig. 2, this mass air flow sensing device 25 comprises a device 56 which converts pressure to mechanical motion and which is provided with bellows or other suitable elements 58, one side of each bellows being subjected to the aforementioned ram pressure. It will be observed that each of the two bellows elements 58 is pivotally connected at its free end 58a, by arm 59 to respectively opposing end of a balanced pivotally mounted beam 77. The central portion of the beam 77 actuates a shaft 78 which is suitably journalled and connected in a manner, not shown, to drive the movable tap 79 of a potentiometer 33. Thus, potentiometer 33 serves as a ram pressure mechanical to electrical transducing device to provide the aforementioned signal output at 52 proportional to ram pressure.

In Fig. 2 the potentiometer 33 is shown connected into a bridge input of the pilot computing regulator 32 to vary the potential across leg 84 of the bridge circuit in proportion to the ram pressure signal. The bridge circuit generally indicated at 81 comprises a pair of fixed legs 82 and 83 and an opposite pair of legs 84 and 85, leg 84 being subjected to a mass air flow or ram pressure input signal 52 as above described, and leg 85 being subjected to a feedback input, to be hereinafter described. The variable resistance of potentiometer 33 is connected between ground and junction point 86 of bridge. The bridge circuit 81 is suitably energized by a battery 88 connected across opposite junctions 86 and 87 of the bridge 81. Two amplifier tubes 89 and 91 are connected across the other terminals of the bridge in such a manner that upon any unbalance in the bridge 81 due to the aforementioned input variables applied thereto, an output signal will appear across the grid circuits of either amplifier tube 89 or 91, depending on the sense of the resultant unbalance in the bridge 81. Instead of amplifier tubes 89 or 91 this portion of the system may include any other suitable type of amplifiers such as magnetic amplifiers or transistors as will be apparent to those skilled in the art. The amplifier tubes 89 and 91 each have their plates connected to a relay circuit comprising battery 92 and relay coils 93 and 94 of the relay indicated generally at 29.

When a suitable grid signal is applied from bridge 81 to either tube 89 or 91, the respective tube is rendered conducting, and a current will flow through relay coil 93 or 94, depending upon which tube is conducting thereby energizing the respective relay coil 93 or 94 to move relay armature 47 and the switch contacts actuated thereby to one of two positions. In the first position, illustrated in Fig. 2, a current from power source 95, indicated at the plus and minus terminals, flows from the plus terminal through switch contacts 96 and the motor winding 90 and returns through contact 97 to the negative terminal of the power source. With energization of the other of the two amplifier tubes 89 or 91, a current from the positive terminal of power source 95 flows through contact 99 through the motor winding 90 and returns through closed contact 98 to the negative side of the power source 95. Servo motor 16a is energized from a D.C. source indicated at 48 by the plus and minus sign terminals. The winding 90 of motor 16a is energized with current flow from source 95 in a particular direction to rotate the armature (not shown) of motor 16a in either a clockwise or counterclockwise direction depending on the sense of the signal received from bridge 81 to open or close pilot valve 16 which is disposed in the pilot fuel line 22, 23.

The shaft 41 of motor 16a drives a screw shaft 42 in the pilot valve 16 by means of a worm 43 and worm gear 44 to increase or decrease the fuel flow through the orifice of valve seat 45 by moving cone 46 in or out of valve seat 45, depending on the direction of rotation of motor 16a. When the bridge circuit 81 is balanced, the relay 29 will be in a neutral position and the motor controlled thereby will be stopped. Suitable damping of the motor action as well as of the signals to the amplifiers may be desirable. Such damping may be provided by well known means, such as "RC" circuits or the like.

A flowmeter device 27 is interposed in the fuel line 23 between pilot valve 16 to the pilot nozzle 19 of the combustor or utilizing device 18. This flowmeter 27, as best illustrated in Fig. 2, may advantageously be a turbine type meter having a rotatably mounted permanent magnet 49 driven by a shaft common to the vanes 53. The magnet 49 when rotated, induces a variable frequency signal voltage in the pickup coil 54. The coil 54 is connected through a full-wave bridge rectifier 55 to provide a D.C. input across leg 85 of bridge 81. As aforementioned, the other variable leg 84 of the bridge is connected to the variable potentiometer 33 of the mass air flow sensing device 25.

Thus it will be apparent that an electrical signal corresponding to the pressure sensed in the mass air flow sensing device 25 and changed into electrical signals by transducing device 33 applies a first input signal at 52 to the bridge circuit 81 across leg 84, while the feedback pickup provided by the flowmeter 27 provides an indication of fuel volume flow or fuel weight flow which is applied as a second input 51 to leg 85 of the bridge. These signal currents appearing across the respective legs of the bridge thus provide a control for the regulation and partial or complete opening or closing of pilot valve 16. An alternative means for measuring fluid flow and generating a signal 51 is to predicate the output signal from flowmeter 27 on frequency alone, rather than both frequency and voltage. Units of this latter type are commercially available. This alternative arrangement would, of course, result in the elimination of rectifier 55 and require recalibration of resistor leg 84 of the bridge circuit 81.

The sensing and transducing section 38 will now be described. As shown in block diagram form in Fig. 1 and schematically in Figs. 2 and 3, static and ram pressure are derived from one or more probes or pitot tubes 35. A static pressure sensing and transducing device is shown generally at 34. A ram pressure sensing and transducing device is similarly shown at 25. Ram pressure is transmitted through conduit 101 from the ram pressure pickup portion 35a of the probe 35 to the mass air flow sensing device 25, as hereinbefore described. Static pressure is transmitted through conduit 102 from the static pressure pickup portion 35b of probe 35 to the static pressure transducer 34. Transducer 34 includes unit 57 which converts the sensed static pressure to mechanical movement and tranducer 115 which converts the mechanical movement to an electrical signal at 72. Mechanical motion proportional to ram pressure is utilized to provide several signal inputs, namely into the pilot mass air flow sensing device 25 and potentiometer 33 to provide the signal at 52, into the main burner rich limit control transducer 183 to provide the signal at 61, and into the main burner control potentiometer 116 to provide the input signal at 74. Therefore, these potentiometers 33, 183 and 116 may all be joined to a common mechanical connection or shaft 78 from a single bellows or diaphragm unit 56 which converts the ram pressure signal to mechanical motion to turn the movable taps of each of the potentiometers 33, 183 and 116 in unison.

In Fig. 3 the bellows device 56 is shown repeated for clarity, one such device 56 being shown for driving the variable tap of potentiometer 183 providing the input signal 61 to the rich limit control and another such bellows device 56 being shown for driving the variable tap of potentiometer 116 providing the input signal at 74 to the main burner regulator 31.

A separate bellows device 57 is provided for converting static pressure into an electrical signal at 72. The construction of device 57 is similar to that of bellows device 56 hereinbefore described, except that conduit 102 introduces static pressure instead of ram pressure to the unit. Bellows elements 103 of device 57 correspond to elements 58 of bellows devices 56. Similarly, movable ends 103a, arms 104, balanced pivotally mounted beam 105, etc. of device 57 correspond to movable ends 58a, arms 59, beam 77, etc., respectively of devices 56. Shaft 113 is suitably mounted in journals, not shown, and is rotated by pivoted beam 105 to move tap 114 of variable resistance element or potentiometer 115.

One of the mathematical functions employed to provide an indication of velocity, as will be shown mathematically later, is the ratio of ram pressure to static pressure. An electronic divider to provide this ratio is shown in Fig. 3. The electrical circuit, Fig. 3, through the static pressure potentiometer resistance 115 comprises a battery 112 with one terminal thereof connected to ground and the second terminal 118 connected through the potentiometer resistance member 115 to ground. The movable tap 114 is electrically connected through a fixed resistance 119 to the input at 72 of a D.C. amplifier 120. The output of the amplifier 120 is connected to the high potential terminal 121 of the ram pressure variable resistance potentiometer 116 with the low potential end thereof connected to ground. The movable tap 117 of the ram pressure potentiometer 116 is connected through a fixed resistor 122 to the input 72 of the D.C. amplifier 120. The function of resistor 122 and the remainder of its circuit between the movable tap 117 of the ram pressure potentiometer 116 and the input of the D.C. amplifier 120 is to provide a feedback loop for improving the response characteristics of the D.C. amplifier 120. A relationship is thus formed such that voltages proportional to the static pressure and to the ram pressure will appear across the composite voltage divider circuit thus provided and an output voltage signal proportional to $P_s$ for static pressure divided by $P_R$ for ram pressure will appear across terminals 123 and 124 at the output of amplifier 120.

In the main computing regulator 31, the output of amplifier 120 is fed to a second amplifying stage 125 which provides a multiplication factor K, producing the multiplication product at the output 126, 127 thereof equal to $$K\frac{P_s}{P_R}$$

As will be shown herein, by certain mathematical relationships, this latter function may be equated to $T_1$, the free stream temperature. The stability of this multiplying amplifier 125 is maintained by the feed back loop containing resistor 128 connected between the output and input of amplifier 125 to make the response of the amplifier 125 substantially independent of the characteristics of the tubes used therein. The multiplying amplifier output at 126 is fed through a series resistor 129 to a junction point 130. A battery 131 having one terminal connected to ground and a second terminal connected through a series resistor 132 is also connected to the junction point 130. Another resistor 133 having one end connected to ground is connected at its other end to junction 130 also. Battery 131 and resistances 132, 129 and 133 are selected in a manner to provide an increase in potential between junctions 126 and 130 equal to a desired constant $C_t$ which will be constant for any given air speed. For example, for an air speed of 2000 f.p.s., $C_t = 333$. A fixed potential proportional to the constant $C_t$ provided by battery 131 is thus added to the output of the multiplying amplifier 125 and resistances 132, 129 and 133 to provide at junction 130 and across resistance 133 the function $$K\frac{P_s}{P_R}+C_t$$

which, as will be shown, is equivalent to $T_S$, the stagnation temperature.
The function $$K\frac{P_s}{P_R}+C_t$$

is applied to one leg 135 of a bridge circuit, generally designated by numeral 134. A first pair of adjacent bridge legs 136 and 137 comprise fixed resistances of equal value. The leg 138 adjacent to leg 135, to which the function $$K\frac{P_s}{P_R}+C_t$$

is applied, comprises a temperature sensitive resistance element 39. This temperature sensitive element provides the function $T_S$, the stagnation temperature. As shown in Fig. 3, leg 138 may include a calibrating variable resistance 141 to calibrate bridge 134. This variable resistor 141 also may be used, if desired in conjunction with a programming device, not shown, to provide predetermined timing or other desired control over the fuel control system to vary velocity or Mach number with time, altitude, or other desired function.

Any unbalance occurring in either of the adjacent grounded legs 135 or 138 of bridge 134 will apply a signal potential to the grid circuit of tube 142 or 143, respectively. The tubes 142 and 143 are connected in push-pull type D.C. amplifier relationship to provide selective actuation of a double-pole-double-throw relay for a motor control circuit, to be later described. The positive terminal of battery 144 is connected to a junction 145 for the relay primary coils 146 and 147. Each relay $R_y-1$, $R_y-2$ is connected in series as a load in the plate to cathode circuit of the tubes 142 and 143.

With conduction through tube 142, for example, the relay coil 146 will draw in the armature 148 to close contacts 149 and 150. A source of potential is connected to the terminals 151, 152 and a current will thus flow from terminal 151 through closed contact 150 through the control winding 161 of the reversible motor 17a in one direction and return through contact 149 to terminal 152. When tube 142 is cut off and tube 143 is conducting the armature 148 will be pulled in by energization of relay coil 147 to close contacts 153 and 154 while opening contacts 149 and 150. This will effect a reversal of current flow through motor winding 161 from the energizing source at terminals 151 and 152 to effect a reversal of the direction of rotation of motor 17a.

Shaft 162 of motor 17a drives a screw shaft 168 of fuel flow control valve 17 through a worm 164 and wormgear 165 arrangement to increase or decrease the fuel flow through the orifice of valve seat 166 by moving cone 167 in or out of valve seat 166 depending on the direction of rotation of motor 17a. When the bridge circuit 134 is balanced the relay will be in a neutral position and the motor 17a controlled thereby will be stopped.

Interposed in the fuel line 40 between the main servo valve 17 and the utilizing combustion device 18 which is connected at 171, is a turbine type flowmeter 28 having a rotatably mounted permanent magnet 173 driven by a shaft common to vanes 174 of said flowmeter 28. The magnet 173 when rotated induces a high frequency current in the pickup coil 175. The coil 175 is connected through a full wave bridge rectifier 176 to a variable resistance element 177 which is connected across one leg 180 of the bridge 178. The other variable leg 179 of the bridge 178 is connected to a variable potential source which includes a battery 181 in series with a first variable resistance element 182. Connected in shunt with the aforementioned battery 181 and resistance 182, is a variable potentiometer 183 having its movable tap 184 grounded. The variable tap 184 is mechanically coupled to the shaft 78 of the aforedescribed ram pressure bellows system 56 or its equivalent.

The tube 191 is connected to apply a control over the amplifier tube 143. The plate of tube 191 is connected to the cathode of tube 143. The cathode of tube 191 is connected to the junction 192 of the bridge 178. The grid terminal 193 of tube 191 is connected to the junction terminal 194 of bridge 178.

Thus, any unbalance of the bridge 178 will vary the bias of tube 191 to render the tube 191 conductive, thereby altering the cathode bias on tube 143. The signal from the ram pressure control leg 179 of the bridge 178 is applied across grid resistor 195 of tube 191 while the D.C. output from the bridge rectifier 176 is applied across variable resistor 177 thus varying the cathode potential on tube 191. The fixed resistance 196 and the variable resistance 197 are connected in series between the plate and grid of tube 191 as a negative feedback network to render the operation of the circuit substantially independent of the tube characteristics of tube 191.

The central control unit or computing regulators of the present invention shown generally at 31 and 32, may be comprised, in the illustrated embodiment of the invention, of all the components in the fuel control system with the exception of the valves, flowmeters, and sensing gages and their transducers. All the components in these central control units may be of the "plug-in" type for ease of service and replacement. The entire control unit itself may thus be easily removable. The ram and static pressure probe 35 is appropriately located to provide accurate pressure readings. Intelligence from the ram pressure transducer 25 and static pressure transducer 34 is transmitted to the central unit. The means for transmitting this intelligence from the probes 35 may be pneumatic, mechanical, electrical or, as shown herein, a combination of mechanical and electrical. The stagnation temperature pickup 39 may be located in any appropriate location, to obtain stagnation temperature, such, for example, as in the engine diffuser duct. The valves 15, 16 and 17 and flowmeters 27 and 28 may be located at any convenient location in the appropriate fuel lines.

Thus, in operation, the computing regulators receive intelligence corresponding to atmospheric ram pressure, atmospheric static pressure and stagnation temperature and transmit the proper signals to the pilot and main burner servo control loops, respectively. The signal to the pilot burner control loop is directly proportional to ram pressure which is very closely proportional to mass air flow. This maintains the specified equivalence ratio, according to desired pilot burner performance requirements. On the other hand, the signal to the main burner control loop is variable with velocity error or Mach number as will be shown hereinafter. Ram pressure and fuel flow information is also used to provide a rich limit override control. The velocity or Mach error signal thus maintains velocity within its specified limits.

The mathematical principles involved in the operation of the computer sections will now be described.

For the pilot burner system, since mass air flow is directly proportional to ram pressure, the output at 52 from the ram pressure transducer 25 is fed directly to the bridge 81, Fig. 2, of the pilot burner computing regulator which maintains a pilot fuel flow proportional to ram pressure and therefore mass air flow, thereby assuring a proper equivalence ratio.

For the main burner system, to maintain a desired velocity, the output signal at 130 Fig. 3 to the bridge 134 of the main burner control loop comprises a signal proportional to ram pressure $P_R$ multiplied by a velocity error signal. Velocity error varies with stagnation temperature $T_S$ and free stream temperature $T_1$ according to the following formula:

(1) $$\frac{V^2}{2} = C_P(T_S - T_1)$$

where, $V$ = air velocity in f.p.s.

$C_P$ = specific heat of air at constant pressure in ft.²/sec.²/°F.

$T_S$ = stagnation temperature in °F.

$T_1$ = free stream temperature in °F.

The above Formula 1 may be derived as follows:
The general energy equation for flow of a perfect gas is:

$$VdV + dH = 0$$

Where, $V$ = velocity of the gas relative to observer $H$ = enthalpy of the gas integrating between two points:

$$\tfrac{1}{2}(V_2^2 - V_1^2) = H_1 - H_2$$

If the gas is at rest at the second point, ($v_2 = 0$):

$$\tfrac{1}{2} V_1^2 = H_2 - H_1$$

However, for a perfect gas:

$$H_i = C_p T_i$$

Where, $C_P$ = specific heat at constant pressure $T$ = temperature (absolute)

Therefore, for a missile traveling at velocity $v$, when the air is assumed to be a perfect gas:

(1) $$\tfrac{1}{2} V^2 = C_P(T_S - T_1)$$

$C_P$ can be considered constant over the ambient range encountered in missile flight, and has been found to be 5,997 ft.²/sec.²/°F. Therefore, for any desired constant air speed such as 2000 f.p.s., for example, the difference between the stagnation temperature $T_S$ and the free stream temperature $T_1$ will be a constant $C_t$. Thus, for example, when $V = 2000$ f.p.s., $$(T_S - T_1) = \frac{V^2}{2C_P} = \frac{(2,000)^2}{2 \times 5,997} = 333° \text{ F.} = C_t$$

constant for a given velocity.

The principle illustrated by the foregoing example is used in the present invention to control the flow of fuel to the main burner and consequently the speed of the missile in the following manner. Three signals corresponding to (1) stagnation temperature $T_S$ (from stagnation temperature pickup 39), (2) free stream temperature $T_1$ (derived from its relationship to ram pressure and static pressure), and (3) a constant temperature $C_t$, which in this example is 333° F. (representing $T_S - T_1$ for a velocity of 2,000 f.p.s.), are fed into the input of bridge 134. The function $T_1 + C_t$ is introduced across one leg 135 of bridge 134, and the valve $T_S$ is introduced across another leg 138 thereof. Whenever the missile flight speed is equal to the speed desired, for example 2,000 f.p.s., the stagnation temperature $T_S$, will equal the free stream temperature $T_1$, plus the constant $C_t$, and there will be zero input to the amplifiers 142, 143. Whenever the air vehicle or missile is flying at some speed other than the desired speed, for example greater or less than 2,000 f.p.s., the resultant $\Delta V$ of the three signals $T_1$, $T_S$, and $C_t$ will no longer equal zero, but will instead take a sense and magnitude such as to restore the speed to that desired.

To provide a signal proportional to free stream temperature $T_1$, although direct measuring vortex-type thermometers may be used, for velocities in the order of 2,000 f.p.s. it is preferable to create such a signal indirectly, as a function of ram and static pressures.

More specifically, the free stream temperature $T_1$ has been determined to be a function of the ratio of static pressure $P_s$ to ram pressure $P_R$ at a constant velocity by the following relationship (at 2,000 f.p.s.):

(2) $$T_1(1 - 8.6 \times 10^{-5} T_1)^{2.5} = 2.1 \times 10^3 \frac{P_s}{P_R}$$

This formula is derived as follows:
Considering a ram pressure probe, it will be apparent to those skilled in the art that a normal shock wave exists ahead of the ram pressure probe at supersonic velocity. Across this shock wave the pressure ratio is:

(3) $$\frac{P_2}{P_s} = \frac{2KM_1^2}{K+1} - \frac{K-1}{K+1}$$

Were, (4)

$P_2$ = static pressure behind shock wave $P_s$ = free stream static pressure $K = \dfrac{C_P}{C_V}$, where $C_V$ = specific heat at constant volume $M_1$ = Mach number before the shock wave $= \dfrac{V_1^2}{KgRT}$ $V_1$ = velocity before shock wave $g$ = acceleration of gravity $R$ = gas constant $= C_P - C_V$ $T$ = temperature (absolute)

In being brought to rest at the entrance to the ram pressure probe, the air undergoes a further compression. This pressure ratio (assuming adiabatic flow) may be expressed, according to well known principles (further defined in Ferri "Elements of Aerodynamics of Supersonic Flow," published by The Macmillan Company, 1949) by the following formula:

(5) $$\frac{P_R}{P_2} = \left(1 + \frac{K-1}{2} M_2^2 \right)^{\frac{K}{K-1}}$$

Where:

$P_R$ = ram pressure $P_2$ = static pressure behind shock wave $K = \dfrac{C_P}{C_V}$, where $C_V$ = specific heat at constant volume $M_2$ = Mach number after shock wave However, Mach number $M_2$ is related to $M_1$ by the relationship:

(6) $$M_2{}^2 = \left(\frac{K+1}{2K}\right)^2 \frac{1}{M_1{}^2 - \frac{K-1}{2K}} + \frac{K-1}{2K}$$

From these four relationships in Equations 3 through 6, the relationship between free stream temperature $T_1$ and the ratio $P_s/P_R$ of static to ram pressure can be found. For example, for air at 2,000 ft./second, the numerical values of the constants are:

$K = 1.4$
$R = 53.3$ ft./° F.
$V = 2,000$ ft./sec.

Using these constants in Equations 3, 4, 5, and 6, the resulting relationship is, as above stated:

(2) $$T_1(1 - 8.6 \times 10^{-5} T_1)^{2.5} = 2.1 \times 10^3 \frac{P_s}{P_R}$$

It may be shown that there is nearly a linear relationship between free stream temperature $T_1$ and ratio $P_s/P_R$ since the value of the term $(1-8.6 \times 10^{-5} T_1)^{2.5}$ has been discovered to vary only from .88 for higher free stream temperatures to .93 for lower free stream temperatures over the range usually encountered in missile flight. Thus, by proper compensation free stream temperature $T_1$ may be made directly proportional to $P_s/P_R$.

(7) $$T_1 = K \frac{P_s}{P_R}$$

Velocity error $\Delta V$ may be shown to have approximately the following relationship between the three functions $T_1$, $T_s$ and $C_t$:

(8) $$\Delta V = T_s - (T_1 + C_t)$$

Proof of Equation 8 is as follows: From Equation 1:

(1) $$\frac{V^2}{2} = C_P(T_s - T_1)$$

(9) $$\frac{V_A{}^2}{2C_P} = T_s - T_1$$

(10) $$\frac{V_D{}^2}{2C_P} = C_t = 333° \text{ F. at 2000 f.p.s., for example}$$

Where:

$V_A$ = actual velocity
$V_D$ = desired velocity, for example 2,000 f.p.s.
$C_t$ = constant representing $T_s - T_1$ at the desired velocity Subtracting Equation 9 from Equation 10:

$$\frac{V_D{}^2 - V_A{}^2}{2C_P} = (C_t - T_s + T_1)$$

$$V_D - V_A = \Delta V = \frac{(C_t - T_s + T_1) 2C_P}{V_D V_A}$$

But, if the velocity error is small over the entire operating range, $V_D + V_A$ will be approximately constant, as will the term $2C_p$.

$$\Delta V = k(C_t - T_s + T_1)$$

Since "$k$" may be compensated for during calibration:

(8) $$\Delta V = C_t - T_s + T_1$$

or:

(11) $$\Delta V = (T_1 + C_t) - T_s$$

The desired condition for velocity control is to make $\Delta V = O$.

Substituting this value in Equation 8:

(12) $$\begin{aligned} 0 &= C_t - T_s + T_1, \text{ or} \\ C_t &= T_s - T_1 \\ T_s &= T_1 + C_t, \text{ when } \Delta V = O \end{aligned}$$

But from Equation 7, $$T_1 = K \frac{P_s}{P_R}$$

Substituting in Equation 12:

(13) $$T_s = K \frac{P_s}{P_R} + C_t$$

But $T_s$ can also be measured directly from stagnation temperature device 39 (Fig. 3). Thus, any difference between $T_s$ (measured) and $T_s$ from Equations 12 and 13 will produce, according to Equation 11, a value of $\Delta V$ other than zero.

Thus, $T_s$ from element 39 is applied to leg 137 of bridge 134. A signal proportional to $T_s$ from Equation 13, i.e.

$$K \frac{P_s}{P_r} + C_t$$

is applied across leg 136 of bridge 134. Thus, when the two sides of Equation 12 are equal (that is, when $\Delta V = 0$), the legs 136 and 137 of bridge 134 will balance. However, when the functions on either side of Equation 12 are not equal, an unbalance will exist in bridge 134 and $\Delta V$ of Equation 11 will become some value other than zero. A value or signal proportional to velocity error $\Delta V$, is thus created at the grid of either amplifier 142 or 143, depending on whether the desired velocity or the actual velocity has the greater value.

The rich limit control is a relationship between mass air flow and fuel flow. Since, as previously explained, ram pressure is proportional to mass air flow:

$$P_R = K F_{max}$$

Where,
$P_R$ = ram pressure
$F_{max}$ = maximum rate of fuel flow at a specified fuel ratio.

Thus, in Fig. 3, a signal proportional to $F_{max}$ is applied across leg 180 of bridge 178, and a signal proportional to $P_R$ is applied across leg 179 of that bridge. Whenever $F_{max}$ is less than $P_R$ ther ewill be no signal generated to output 71 because of the bias characteristics of tube 191. However, whenever $F_{max}$ is greater than $P_R$, an unbalance will exist which will generate a signal at 71 to serve as an overriding rich limit control to actuate amplifier 143, thereby reducing fuel flow to the main burner.

Of course, the rich limit control device 37 may not be necessary in certain vehicles where the power plant or engine is of sufficient power as to be capable of maintaining the vehicle at the desired speeds.

The term "comparator" as used herein is intended to define any means, for example a scale balance or a bridge circuit, which will compare two values, one of which values may or may not be a standard, and generate an energy signal proportional to the difference between said two values.

By the term "desired velocity" as used herein, it is meant either preset constant velocity or programmed velocity which is not necessarily preset, programmed velocity being controlled by signals from appropriate devices such as engine speed sensing devices, map-matching devices, altitude sensing devices, and devices sensitive to navigational maneuvering, for example the type of device which senses a signal to slow down the missile when it assumes a nosing over position at high speeds so as not to tear the wings off the missile during the maneuver. Within the scope of this invention, varying signals from such devices may be fed into the computer section for the main burner and be combined with or superimposed upon signals from the speed or Mach sensing device, thereby resulting in a controlled variable speed, as well as a controlled constant speed as described herein.

By the term "actual velocity" is means velocity either with respect to the medium through which the missile or aircraft is flying, when it will be true air speed or Mach number, or else it may mean with respect to ground.

By the term "velocity error" is meant the difference between desired velocity and actual velocity, and may be either positive or negative depending on whether desired velocity or actual velocity is the greater.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention. Also, it is to be understood that the fuel control system shown herein has been employed for purposes of illustration only, and that any of these systems may be changed or additional elements added to meet varying demands of different classes of service or different environments without departing from the principles of the invention. While bellows type pressure transducers have been specifically disclosed, it is also obvious that other pressure gages, such as diaphragms, Sylphons, Belloframs, bourdon tubes or pistons doubled and properly balanced on a beam to minimize the difficulties of prior art devices, may be used. It is further obvious that, while a bridge and tube amplifier circuit has been shown, other arrangements will also operate satisfactorily, such as with magnetic amplifiers, and with substitution of other equivalent circuit elements with appropriate modification of the source potentials where necessary.

In addition a ramjet engine is here used as an illustration. However, it is to be understood that this invention may be used as well, with appropriate obvious variations where necessary, to control flow of gaseous or liquid fuel to other types of fuel-burning engines.

Obviously many modifications and variations of the present invention are possible in the light of the above teachings. It is therefore to be understood that within the scope of the appended claims the invention may be practiced otherwise than as specifically described.

What is claimed is:

1. A main burner computing regulator for controlling fuel flow to the main burner of a ramjet engine of a vehicle, comprising a first means for introducing a signal proportional to static pressure, a second means for introducing a signal proportional to ram pressure, a third means operably connected to said first and second means for providing a signal proportional to the ratio of static pressure to ram pressure, a fourth means for multiplying by a predetermined constant said signal proportional to the ratio of static pressure to ram pressure and for producing a signal proportional to the product of said predetermined constant and said ratio of pressures, fifth means for adding to the output signal produced by said fourth means a constant proportional to stagnation temperature at a desired velocity minus free stream temperature at the desired velocity, a bridge circuit across one leg of which the output signal from said fifth means is applied, a stagnation temperature pickup device for producing a stagnation temperature signal proportional to stagnation temperature of the air through which the vehicle is moving, said signal from said stagnation temperature pickup device being applied across a second leg of said bridge circuit, any unbalance of said bridge circuit producing a bridge output signal proportional to the difference between the signal from said fifth means and said stagnation temperature signal, said bridge output signal also being proportional to velocity error, and amplifier means operably connected to said bridge circuit and operable by the bridge output signal to produce an amplifier output the sense of which will vary depending on whether the velocity error is positive or negative, whereby said amplifier output signal may be applied to a servo-valve throttling means for varying the flow of fuel to said main burner to return the vehicle to the desired velocity.

2. A device as set forth in claim 1 wherein a programming device is provided across one of the legs of said bridge circuit to vary one of said signals applied to said bridge circuit, whereby the velocity of said vehicle may be programmed with respect to time, altitude or other desired function.

3. A fuel control system for controlling the rate of fuel flow to a combustor of a vehicle, comprising means for sensing and transducing operative functions indicative of the actual vehicle velocity and for determining when the actual vehicle velocity differs from a desired vehicle velocity and for producing a velocity error signal proportional to the difference between said actual vehicle velocity and said desired vehicle velocity, rich limit control means operably connected to said first-named means for producing a rich limit overriding signal for overriding said vehicle velocity error signal when fuel flow to said combustor exceeds the limit of a predetermined fuel air ratio, and a servo-valve operably connected to said first-named means and operable by said velocity error signal, the fuel flow to said combustor thereby being increased by the servo-valve opening when actual vehicle velocity is lower than the desired velocity and decreased by the servo-valve when the actual vehicle velocity is greater than the desired velocity, and the servo-valve responds to the rich limit overriding signal by preventing valve opening or by tending to close said valve to prevent increase of fuel/air ratio beyond said predetermined limit, and wherein said means for sensing and transducing operative functions indicative of actual vehicle velocity comprises pressure sensing devices having movable ends, a beam pivoted about a pivot point and connecting said movable ends of said pressure sensing devices so as to be rotated about said pivot point whenever said pressure sensing devices impart motion to said beam, a shaft mounted at said pivot point of said beam and operably mounted to be rotated by said beam, a potentiometer mounted so as to be operated by rotation of said shaft, said potentiometer being capable of producing an output signal proportional to the pressure being sensed.

4. A fuel-feed control device for a vehicle power plant having in said power plant a main burner and a pilot burner fuel flow metering means for each of said burners respectively and of a character wherein the fuel supplied to said main burner is metered on the basis of desired vehicle velocity modified by operative functions indicative of actual vehicle velocity and wherein the fuel supplied to said pilot burner is metered on the basis of operative functions indicative of mass air flow to the power plant, comprising fuel pressure producing means, fuel flow throttling means for each of said burners respectively, regulators for controlling said fuel flow throttling means, means disposed in operative relationship with said regulators for sensing changes in operative functions indicative of said actual vehicle velocity and of said mass air flow, and servo means for actuating said fuel flow throttling means in correlation with said sensed operative functions.

References Cited in the file of this patent
UNITED STATES PATENTS

| | | |
|---|---|---|
| 2,648,194 | Jorgensen et al. | Aug. 11, 1953 |
| 2,729,061 | Grafinger et al. | Jan. 3, 1956 |
| 2,765,619 | Peterson | Oct. 9, 1956 |
| 2,850,871 | Drake | Sept. 9, 1958 |
| 2,871,659 | Chamberlin et al. | Feb. 3, 1959 |